(12) United States Patent
Zhang

(10) Patent No.: US 11,926,476 B2
(45) Date of Patent: Mar. 12, 2024

(54) TRANSPORT VEHICLE

(71) Applicant: BEIJING JINGDONG QIANSHI TECHNOLOGY CO., LTD., Beijing (CN)

(72) Inventor: Jian Zhang, Beijing (CN)

(73) Assignee: BEIJING JINGDONG QIANSHI TECHNOLOGY CO., LTD., Beijing (CN)

(*) Notice: Subject to any disclaimer, the term of this patent is extended or adjusted under 35 U.S.C. 154(b) by 245 days.

(21) Appl. No.: 17/421,797

(22) PCT Filed: Jan. 3, 2020

(86) PCT No.: PCT/CN2020/070179
§ 371 (c)(1),
(2) Date: Jul. 9, 2021

(87) PCT Pub. No.: WO2020/156026
PCT Pub. Date: Aug. 6, 2020

(65) Prior Publication Data
US 2022/0089370 A1 Mar. 24, 2022

(30) Foreign Application Priority Data
Feb. 3, 2019 (CN) .......................... 201910108704.3

(51) Int. Cl.
*B65G 1/04* (2006.01)
*B60K 17/04* (2006.01)

(52) U.S. Cl.
CPC .......... *B65G 1/0492* (2013.01); *B60K 17/043* (2013.01)

(58) Field of Classification Search
CPC ............................. B60K 17/043; B65G 1/0492
See application file for complete search history.

(56) References Cited

U.S. PATENT DOCUMENTS

| 4,850,786 A * | 7/1989 | Oswald ................. B66C 19/007 |
| | | 294/81.2 |
| 2005/0183896 A1* | 8/2005 | Fenelli ................. B66F 9/07577 |
| | | 180/65.265 |
| 2014/0257555 A1 | 9/2014 | Bastian, II et al. |

FOREIGN PATENT DOCUMENTS

| CN | 108033184 A | 5/2018 |
| CN | 108584259 A | 9/2018 |

(Continued)

OTHER PUBLICATIONS

Notice of Reasons for Refusal dated Jul. 26, 2022 for Japan Application No. 2021-540575.

(Continued)

*Primary Examiner* — Saul Rodriguez
*Assistant Examiner* — Willie W Berry, Jr.
(74) *Attorney, Agent, or Firm* — Qinghong Xu

(57) ABSTRACT

A transport vehicle includes: a vehicle body (31) and a first traveling mechanism (32) mounted on the vehicle body (31). The first traveling mechanism (32) includes a plurality of crawling assemblies (320) respectively provided on two opposite sides of the vehicle body (31). Each crawling assembly (320) includes: a wheel carrier (321) extending outwardly from a lateral side of the vehicle body (31); and a driving wheel (322) mounted on the wheel carrier (321), the driving wheel has an axis perpendicular to an extending direction of the wheel carrier (321). The wheel carrier (321) is rotatable about the central axis of the wheel carrier (321) in the extension direction.

12 Claims, 15 Drawing Sheets

(56) References Cited

FOREIGN PATENT DOCUMENTS

| CN | 108726064 A   | 11/2018 |
| CN | 209720654 U   | 12/2019 |
| CN | 209720656 U   | 12/2019 |
| CN | 209853078 U   | 12/2019 |
| JP | 2987020 B2    | 12/1999 |
| TW | I639541 B     | 11/2018 |
| WO | 2005077789 A1 | 8/2005  |
| WO | 2016199033 A1 | 12/2016 |
| WO | 2018154574 A1 | 8/2018  |
| WO | 2018189110 A1 | 10/2018 |

OTHER PUBLICATIONS

Extended European Search Report dated Aug. 26, 2022 for European Patent Application No. 20749549.0.
International Search Report dated Mar. 26, 2020 for PCT international application No. PCT/CN2020/070179.

* cited by examiner

TRANSPORT VEHICLE

CROSS-REFERENCE TO RELATED APPLICATION

This application is a national phase application under 35 U.S.C. § 371 of International Patent Application No. PCT/CN2020/070179, filed on Jan. 3, 2020, which claims the priority to the Chinese Patent Application NO. 201910108704.3, entitled "TRANSPORT VEHICLE", filed on Feb. 3, 2019, the entire contents of which are hereby incorporated by reference.

TECHNICAL FIELD

The present disclosure generally relates to a transport vehicle technology.

BACKGROUND

With the development of society, people's demand for production and living materials has greatly increased, and commodity exchange and the number and frequency of circulation have increased rapidly, which has promoted the development of the express logistics industry. As an important transportation equipment, a shuttle vehicle can reciprocate on racks of a stereoscopic warehouse to transport a cargo box into and out of the warehouse, thereby greatly improving efficiency of picking and selection. It is widely used in food and medicine, luggage handling, postal express and industrial logistics and other industries.

Shuttle racks are usually arranged in a multi-layer rack structure, and at least one horizontal shuttle rail is provided on each layer of racks. The shuttle vehicle runs on a horizontal shuttle rail. An elevator is provided next to a shuttle rail. When a shuttle vehicle needs to enter an upper or lower shuttle rail from a current shuttle rail, it is necessary to first move a carrier of the elevator to the current shuttle rail, and then the shuttle vehicle can enter into the carrier of the elevator, the elevator raises or lowers the carrier to reach the shuttle rail of a desired layer, and finally the shuttle vehicle can enter the shuttle rail of the desired layer.

When demand for outbound and inbound orders is large, all shuttle vehicles can only reciprocate along the horizontal shuttle rail, and the elevator is needed when the shuttle rail of the shuttle vehicle is switched, which inevitably causes congestion.

The above information disclosed in the background section is only used to enhance the understanding of the background of the present disclosure, and therefore it may include information that does not constitute the prior art known to those of ordinary skill in the art.

SUMMARY

A series of simplified concepts are introduced in this section, which will be explained in further detail in the detailed description. The content of this section does not mean to try to define key features and necessary technical features of the claimed technical solution, nor does it mean to try to determine the protection scope of the claimed technical solution.

A main purpose of the present disclosure is to overcome at least one of the above drawbacks of the prior art and provide a transport vehicle, which includes: a vehicle body and a first traveling mechanism mounted on the vehicle body;

the first traveling mechanism includes:
a plurality of crawling assemblies respectively provided on two opposite sides of the vehicle body, and each crawling assembly includes:
a wheel carrier extending outwardly from a side of the vehicle body;
a driving wheel mounted on the wheel carrier and having an axis perpendicular to an extending direction of the wheel carrier;
the wheel carrier has a central axis in the extending direction and is rotatable about the central axis According to an embodiment of the present disclosure, the each crawling assembly further includes: a guide wheel mounted on the wheel carrier and having an axis parallel to the extending direction of the wheel carrier.

According to an embodiment of the present disclosure, the central axis of the wheel carrier passes through a center of the driving wheel, and a number of the guide wheels is two, and the two guide wheels are respectively arranged on two opposite sides of the driving wheel and have a same distance to the central axis of the wheel carrier.

According to an embodiment of the present disclosure, the wheel carrier is configured to be retractable into and extendable out of the vehicle body; and
the transport vehicle further includes a second traveling mechanism arranged on a bottom of the vehicle body, wherein the second traveling mechanism is configured to be movable on ground.

According to an embodiment of the present disclosure, the second traveling mechanism includes: a plurality of universal wheels respectively disposed at both ends of the bottom of the vehicle body, and two driving wheels respectively disposed at both sides of middle of the bottom of the vehicle body, and each driving wheels can actively roll.

According to an embodiment of the present disclosure, the each crawling assembly further includes:
a mounting seat slidably connected with the vehicle body;
a rotating drum rotatably connected with the mounting seat, the rotating drum being rotatable around an axis of the rotating drum;
a transmission mechanism arranged in the wheel carrier, wherein the transmission mechanism is in transmission connection with the driving wheel; and
an input shaft penetrating the rotating drum and extending from a first end of the wheel carrier into the wheel carrier, wherein the input shaft is in transmission connection with the transmission mechanism, and both of an axis of the input shaft and the axis of the rotating drum are coincide with the central axis of the wheel carrier;
the first traveling mechanism further includes a crawling drive assembly for driving the input shaft to rotate, and a rotating drive assembly for driving the rotating drum to rotate.

According to an embodiment of the present disclosure, the first traveling mechanism further includes a telescopic drive assembly, and the telescopic drive assembly includes:
a plurality of sliding rails disposed to be parallel to the central axis of the wheel carrier and arranged on the vehicle body;
a plurality of sliding blocks mounted on the plurality of sliding rails respectively and connected to a plurality of mounting seats respectively; and
a linear actuator configured to drive the plurality of mounting seat to slide.

According to an embodiment of the present disclosure, the vehicle body includes a front end and a rear end opposite to the front end; and the plurality of crawling assemblies have at least four crawling assemblies, wherein two crawling assemblies are respectively disposed on two opposite sides of the front end, and another two crawling assemblies are respectively disposed on two opposite sides of the rear end.

According to an embodiment of the present disclosure, a first rotating shaft is provided on the driving wheel, and is rotatably connected with the wheel carrier; and the transmission mechanism includes:
a first bevel gear sleeved on the input shaft;
a second rotating shaft rotatably connected to the wheel carrier and parallel to the first rotating shaft;
a second bevel gear sleeved on the second rotating shaft and engaged with the first bevel gear;
wherein, the second rotating shaft is in transmission connection with the first rotating shaft.

According to an embodiment of the present disclosure, the transmission mechanism further includes:
a first cylindrical gear sleeved on the first rotating shaft;
a second cylindrical gear sleeved on the second rotating shaft;
a mandrel mounted on the wheel carrier and parallel to the first rotating shaft;
a third cylindrical gear sleeved on the mandrel, wherein the third cylindrical gear is rotatable about the mandrel, the third cylindrical gear is engaged with the first cylindrical gear and the second cylindrical gear respectively.

According to an embodiment of the present disclosure, a middle part of the second rotating shaft is rotatably connected with the wheel carrier, and the second bevel gear and the second cylindrical gears are respectively arranged at both ends of the second rotating shaft, and the first bevel gear is disposed between the second bevel gear and the second cylindrical gear.

According to an embodiment of the present disclosure, the driving wheel is a flat wheel, a synchronous wheel, a gear or a sprocket.

According to the above technical solutions, the advantages and positive effects of the transport vehicle of the present disclosure are as follows:

the transport vehicle of the present disclosure can run along both of the horizontal rail and the vertical rail, and can quickly complete switching between the horizontal rail and the vertical rail. Compared with the transport vehicle in the prior art, the traveling mode according to the present application is more flexible, especially on a rail network that is intertwined with horizontal and vertical rails. When there is congestion in a travelling direction of the vehicle, a switching of rail can be performed to avoid the congestion rail, and the operation efficiency is higher.

BRIEF DESCRIPTION OF THE DRAWINGS

Objectives, features, and advantages of the present disclosure will become more apparent by take account into the following detailed description of embodiments of the present disclosure in combination with the drawings. The drawings are merely exemplary illustrations of the present disclosure, and are not necessarily drawn to scale. In the drawings, the same reference numerals always refer to the same or similar parts.

DETAILED DESCRIPTION

Figure 1:
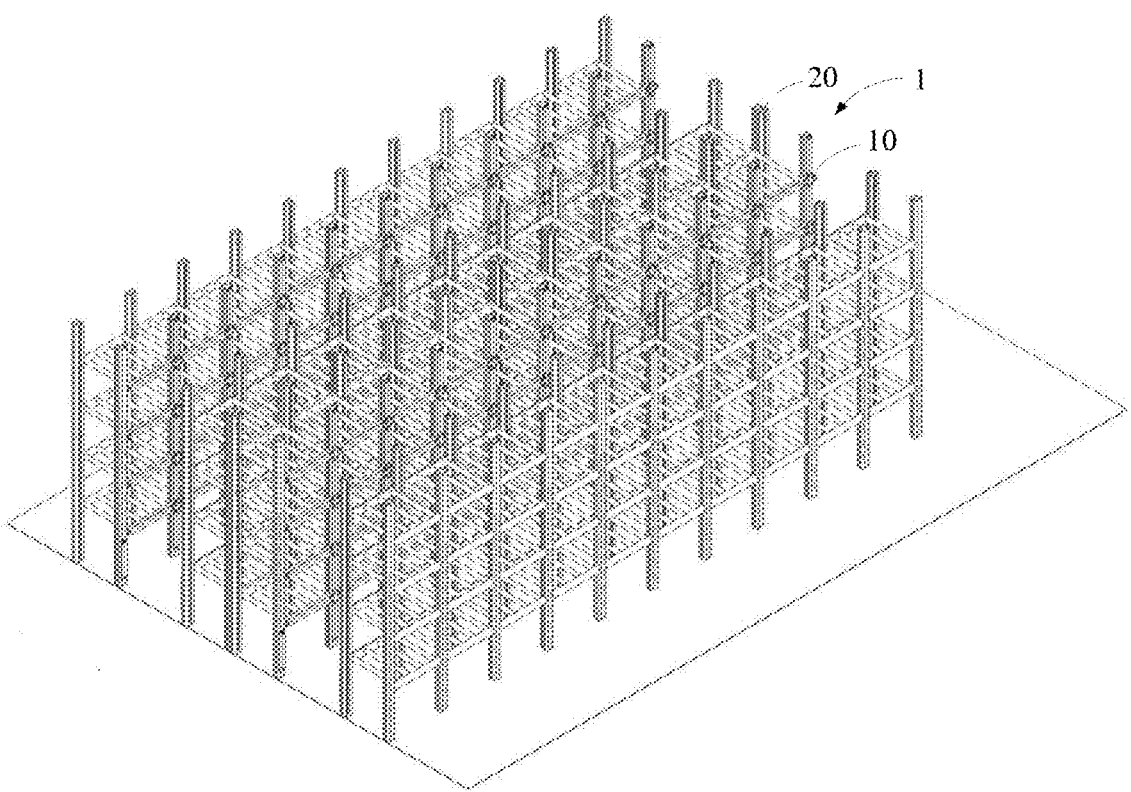
FIG. 1 is a perspective diagram showing a stereoscopic rack according to an exemplary embodiment.

Example embodiments will now be described more fully with reference to the accompanying drawings. However, embodiments can be implemented in various forms, and should not be construed as being limited to the embodiments set forth herein. On the contrary, these embodiments are provided so that the present disclosure will be comprehensive and complete, and fully convey concepts of the example embodiments to those skilled in the art.

The same reference numerals in the drawings indicate the same or similar structures, and thus repeated descriptions will be omitted.

Figure 2:
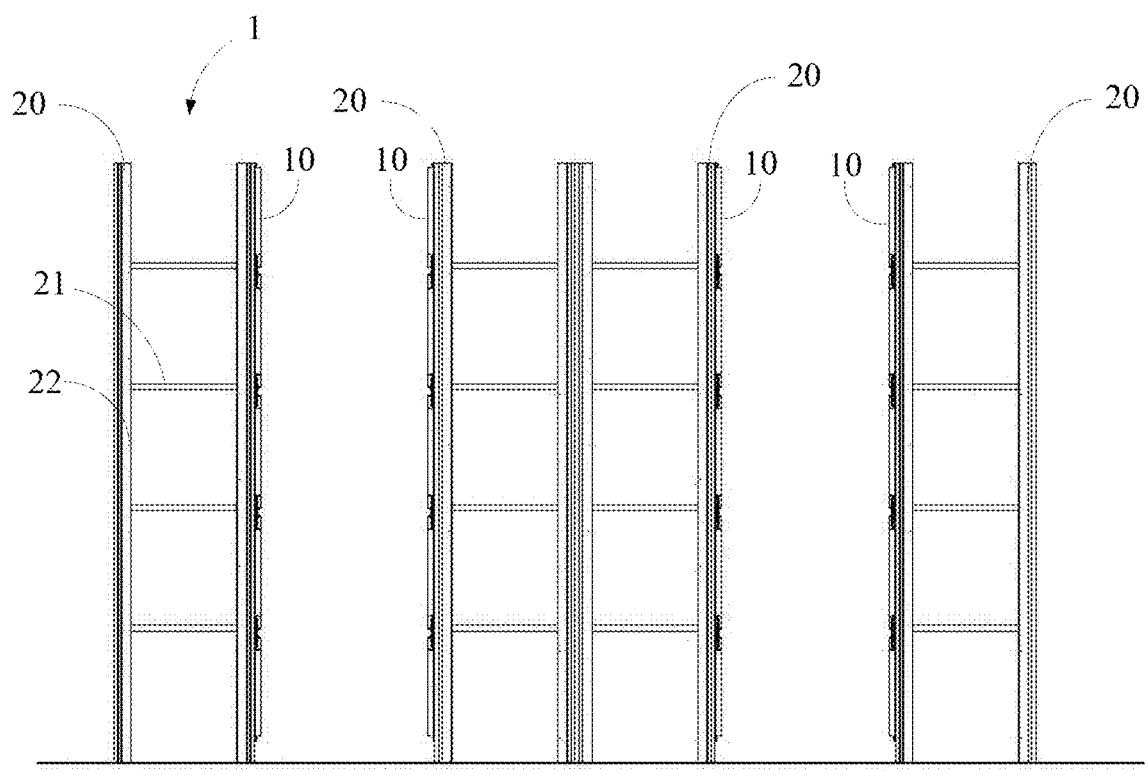
FIG. 2 is a side view of a stereoscopic rack according to an exemplary embodiment.

FIG. 1 and FIG. 2 show a stereoscopic rack 1 in an embodiment. The stereoscopic rack 1 includes a rack body 20 and a rail assembly 10 provided on a side of the rack body 20. In a warehouse, multiple stereoscopic racks 1 can be arranged, and multiple stereoscopic racks 1 are arranged side by side. For example, the number of stereoscopic racks 1 can be four. As shown in FIG. 2, every two adjacent stereoscopic racks 1 form a group, and the two stereoscopic racks 1 in a group are separated from each other to form an aisle with uniform width between the two stereoscopic racks 1. The guide rail assembly 10 on the stereoscopic rack 1 is arranged on a side of the stereoscopic rack 1 close to the aisle, so that two guide rail assemblies 10 are respectively arranged at both sides of the aisle. The crawling assemblies 320 at both sides of the transport vehicle 3 can respectively cooperate with the two guide rail assemblies 10 and run along the guide rail assemblies 10, and thus the transport vehicle 3 can travel in the aisle.

Figure 3:
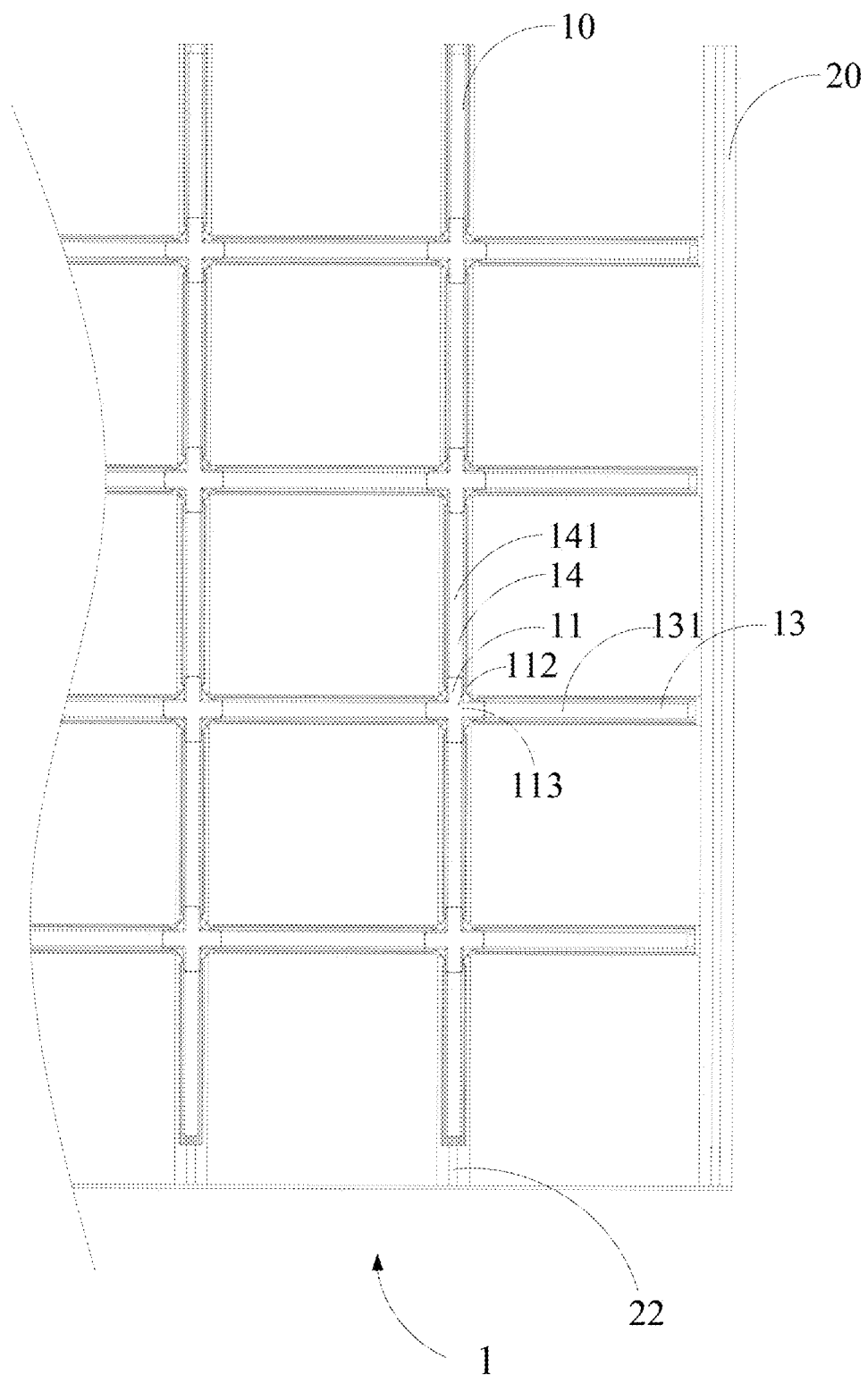
FIG. 3 is a partial front view of a stereoscopic rack according to an exemplary embodiment.

Referring to FIG. 3, the guide rail assembly 10 includes a steering guide rail 11, a first rail 13 and a second rail 14.

The steering guide rail 11, the first rail 13 and the second rail 14 are all mounted on the rack body 20. The first rail 13, the second rail 14 and the steering guide rail 11 are all arranged in a same plane, which is preferably a vertical plane. The first rail 13 extends along a horizontal direction. The second rail 14 extends in the vertical direction. The first rail 13 and the second rail 14 intersect perpendicularly. The steering guide rail 11 is mounted at an intersection of the first rail 13 and the second rail 14. Both the first rail 13 and the second rail 14 are divided into multiple sections by the steering guide rail 11.

Figure 4:
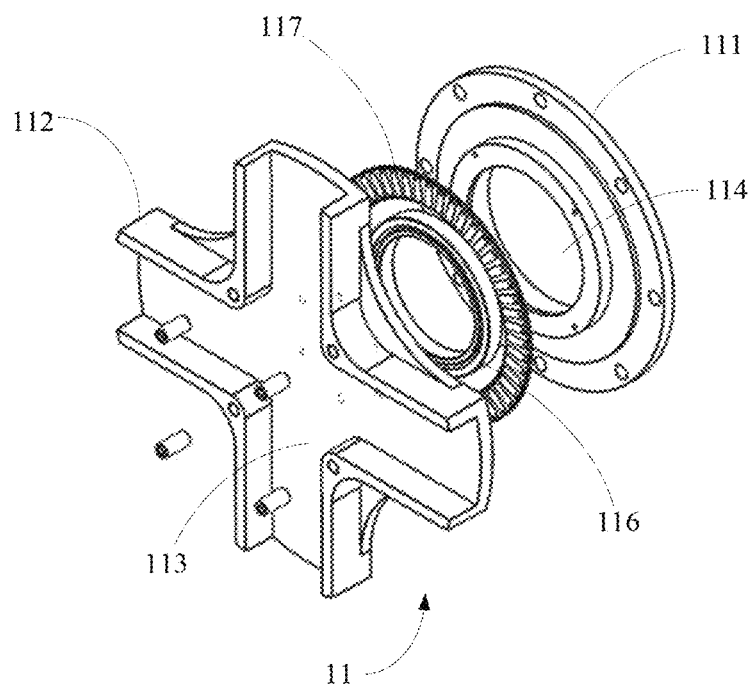
FIG. 4 is a diagram showing a disassembly of a steering guide rail according to an exemplary embodiment.
Figure 5:
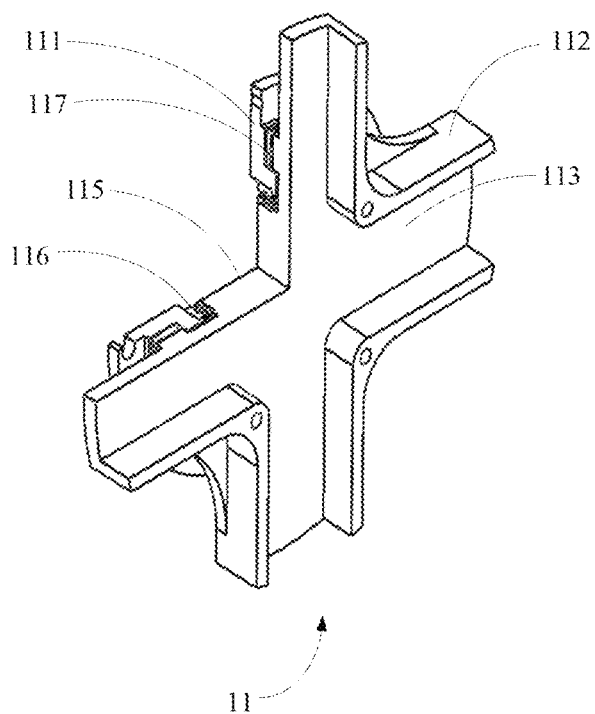
FIG. 5 is a partial cross-sectional view of a steering guide rail according to an exemplary embodiment.

Referring to FIG. 4 and FIG. 5, the steering guide rail 11 includes a mounting seat 111 and a rotating part 112. The mounting seat 111 is mounted on an upright post 22. The rotating part 112 is mounted on the mounting seat 111 and is located on a side of the mounting seat 111 distal to the rack body 20. The rotating part 112 is rotatably connected to the mounting seat 111, and the rotating part 112 can rotate with respect to the mounting seat 111. The rotating part 112 rotates around a central axis perpendicular to a bottom surface of a guide groove 113. The central axis is a straight line passing through center of the guide groove 113 and perpendicular to the bottom surface of the guide groove 113. The rotating part 112 includes the guide groove 113. The guide groove 113 is located on a side of the rotating part 112 distal to the rack body 20. The guide groove 113 includes two straight grooves. The two straight grooves have a same length. The two straight grooves intersect vertically to each other, and the intersection point is a midpoint of each straight groove, and the intersection point is the center of the guide groove 113. The two straight grooves are both perpendicular to a rotating axis of the rotating part 112, and the rotating axis passes through the center of the guide groove 113. The guide groove 113 may be cross-shaped. Two ends of the straight groove respectively extend to edges of opposite sides of the rotating part 112.

In this embodiment, a mounting hole 114 is provided on the mounting seat 111, and the mounting hole 114 is a round hole. The mounting hole 114 is provided in center of the mounting seat 111. The mounting hole 114 may be a through hole. The rotating part 112 is provided with a rotating shaft 115. The rotating shaft 115 is provided on a side of the rotating part 112 close to the mounting seat 111. The rotating shaft 115 extends into the mounting hole 114. The rotating shaft 115 has a diameter smaller than that of the mounting hole 114, and an axis of the rotating shaft 115 is coaxial with an axis of the mounting hole 114.

The steering guide rail 11 also includes a slewing bearing 116. The slewing bearing 116 includes an inner ring, an outer ring, and a roller arranged between the inner ring and the outer ring. The slewing bearing 116 is preferably a ball bearing. An inner ring of the slewing bearing 116 is sleeved on the rotating shaft 115, and the inner ring preferably has an interference fit with the rotating shaft 115. An outer circumferential wall of an outer ring of the slewing bearing 116 abuts against an inner circumferential wall of the mounting hole 114, and there is an interference fit between the outer ring of the slewing bearing 116 and the mounting hole 114.

In this way, the mounting seat 111 and the rotating part 112 can be rotatably connected to each other by the slewing bearing 116, and the mounting seat 111 and the rotating part 112 are rotationally matched precisely.

The steering guide rail 11 also includes a thrust bearing 117. The thrust bearing 117 may be one of a thrust cylindrical roller bearing, a thrust tapered roller bearing and a thrust ball bearing. The thrust bearing 117 is sandwiched between the mounting seat 111 and the rotating part 112. The thrust bearing 117 and the slewing bearing 116 are arranged coaxially.

In this way, axial load that the thrust bearing 117 can carry is maximized, and the slewing bearing 116 has a longer service life. At the same time, the mounting seat 111 and the rotating part 112 can achieve a tighter fit therebetween, and thus to reduce relatively moving.

Figure 6:
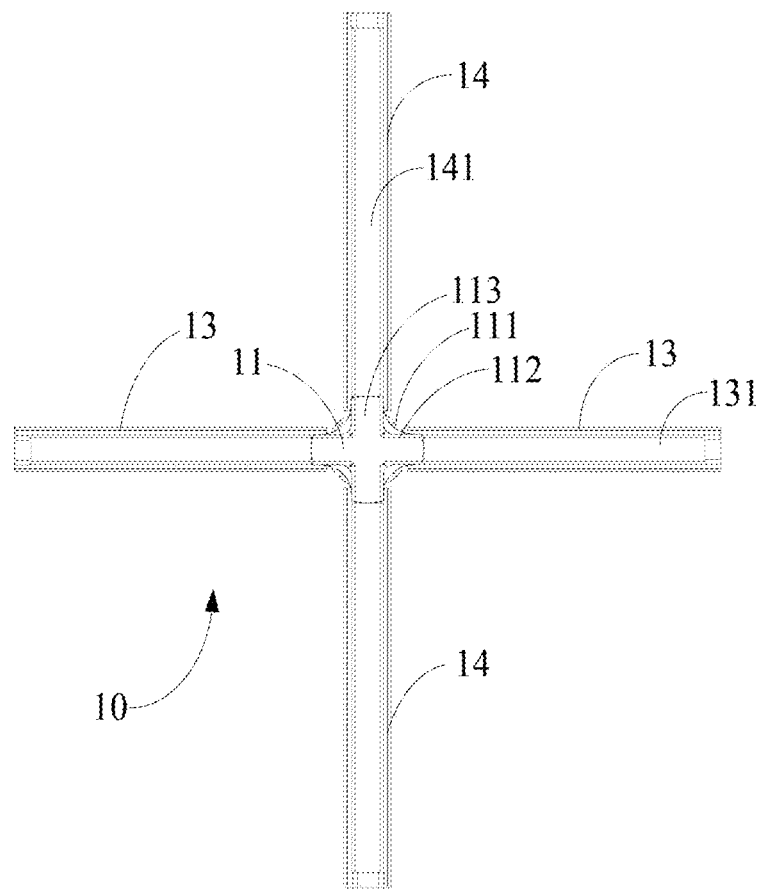
FIG. 6 is a partial front view of a guide rail assembly according to an exemplary embodiment.

Referring to FIG. 6, the first rail 13 is a straight rail. A first groove 131 is provided on the first rail 13. The first groove 131 extends along the first rail 13, that is, the first groove 131 extends in a horizontal direction. The second rail 14 is a straight rail. A second groove 141 is provided on the second rail 14. The second groove 141 extends along the second rail 14, that is, the second groove 141 extends in a vertical direction. Both ends of the first groove 131 and the second groove 141 extend to the rotating part 112. When the rotating part 112 rotates, the rotating part 112 can rotate to a position where the guide groove 113 is connected to both of the first groove 131 and the second groove 141. That is, a straight groove in the guide groove 113 is connected to the first groove 131, another straight groove is connected to the second groove 141.

A bottom of each of the first groove 131, the second groove 141 and the two straight grooves of the guide groove 113 can be mounted with a transmission element extending along an extending direction of the groove. The transmission element can be a timing belt, a rack or chain.

There are a plurality of first rails 13 and second rails 14. The first rails 13 and storage brackets 21 are arranged in a one-to-one correspondence, and each first rail 13 is arranged on an edge of a corresponding storage bracket 21. The plurality of second rails 14 are respectively arranged on the plurality of upright posts 22. The second rails 14 are arranged in a one-to-one correspondence with the upright post 22 located on a same side of the stereoscopic rack 1, and each second rail 14 is disposed on a corresponding upright post 22. The plurality of first rails 13 and the plurality of second rails 14 are all located in s same vertical plane, and the plurality of first rails 13 and the plurality of second rails 14 are interwoven into a rail network. There are also a plurality of steering guide rails, and the plurality of steering guide rails are respectively arranged at each intersection in the rail network.

Figure 7:
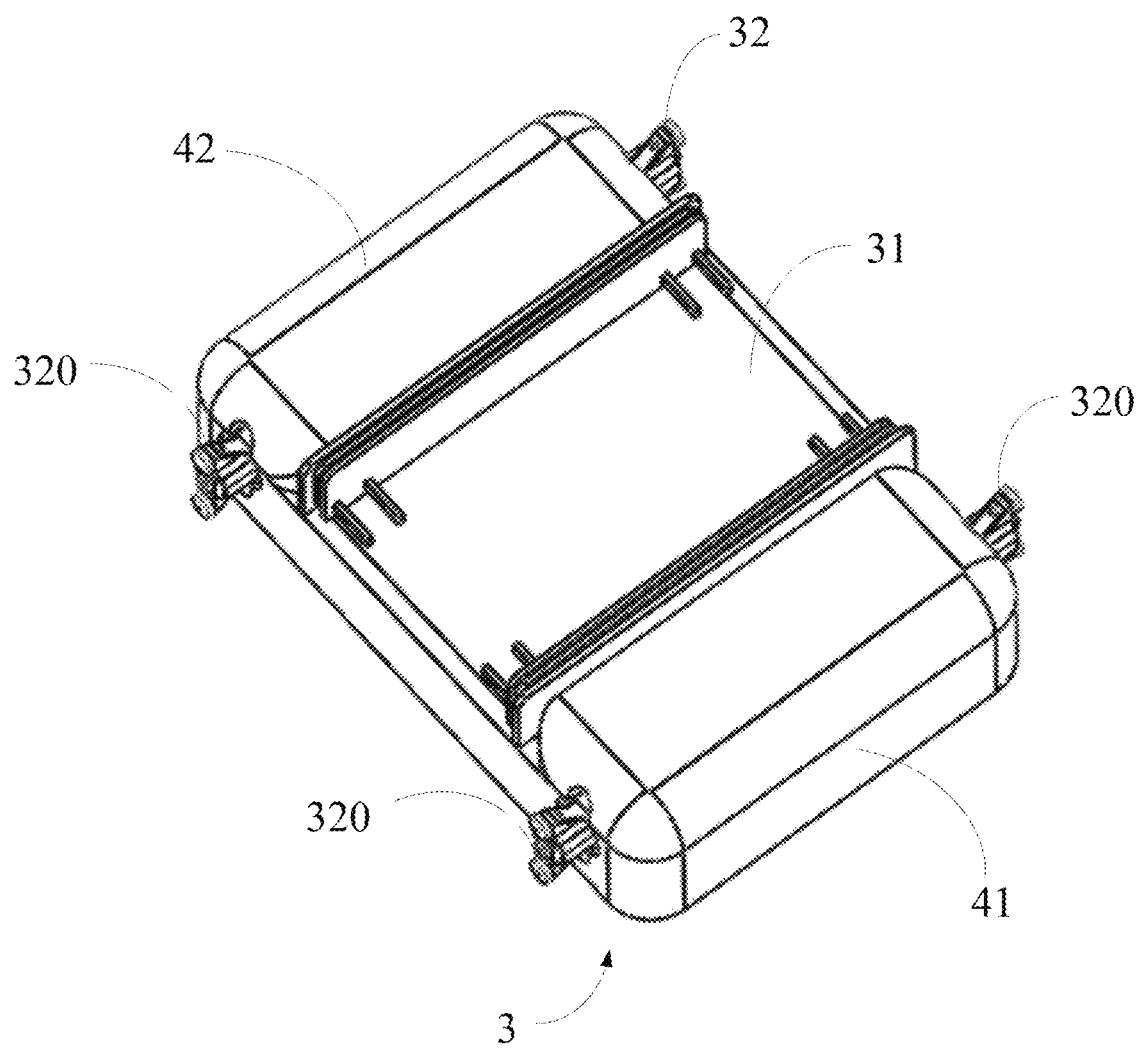
FIG. 7 is a perspective diagram showing a transport vehicle according to an exemplary embodiment.

FIG. 7 shows a transport vehicle 3 according to an embodiment. The transport vehicle 3 is preferably an Automated Guided Vehicle (Automated Guided Vehicle).

The transport vehicle 3 includes a vehicle body 31 and a first traveling mechanism 32. The first traveling mechanism 32 is mounted on the vehicle body 31. The first traveling mechanism 32 is used to drive the vehicle body 31 to run along the guide rail assembly 10. The vehicle body 31 may be provided in a shape of substantially rectangular structure. The vehicle body 31 includes a front end 41 and a rear end 42 opposite to the front end 41. The front end 41 may be the front end 41 of the vehicle body 31, and the rear end 42 may be the rear end 42 of the vehicle body 31.

The first traveling mechanism 32 includes four crawling assemblies 320. The four crawling assemblies 320 are respectively arranged on two opposite sides of the vehicle body 31. The transport vehicle 3 is located between the two guide rail assemblies 10 when crawling along the rail, and the crawling assemblies 320 on both sides of the transport vehicle 3 abut against the guide rail assemblies 10 at both sides to support the transport vehicle 3.

In this embodiment, two crawling assemblies 320 are respectively disposed on two opposite sides of the front end 41 of the vehicle body 31, and the other two crawling assemblies 320 are respectively disposed on two opposite sides of the rear end 42 of the vehicle body 31. The four crawling assemblies 320 can support the vehicle body 31 from positions close to the four corners of the vehicle body 31, which is more stable and reliable.

Figure 8:
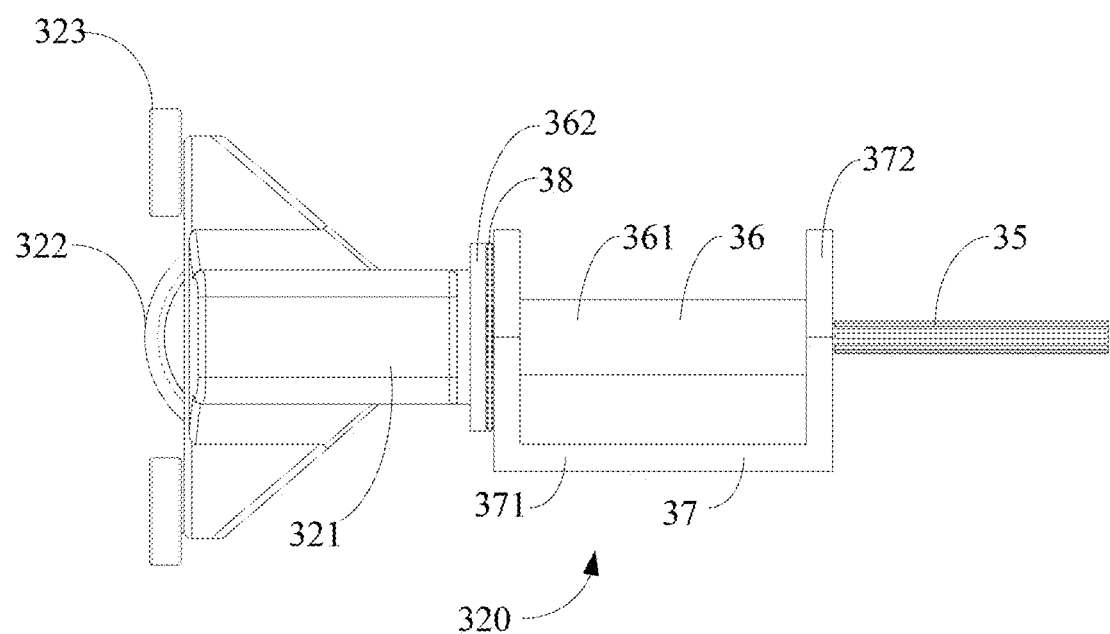
FIG. 8 is a front view showing a crawling assembly according to an exemplary embodiment.
Figure 9:
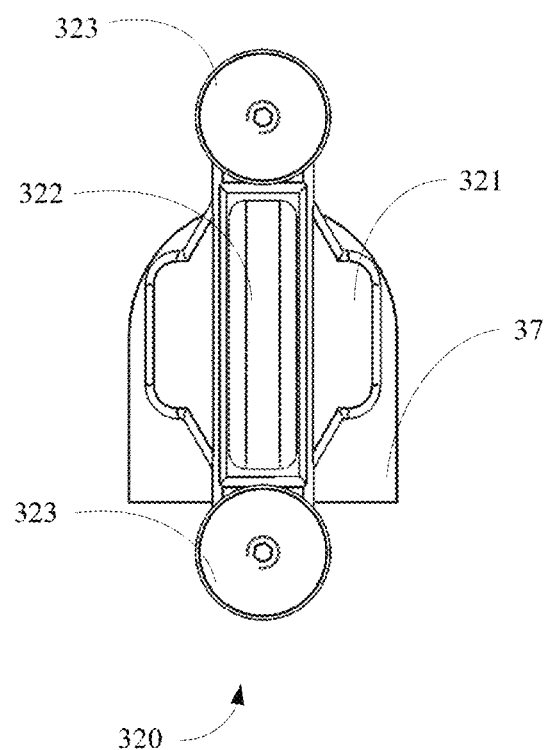
FIG. 9 is a left view of a crawling assembly according to an exemplary embodiment.

FIGS. 8 and 9, each crawling assembly 320 includes a wheel carrier 321, a driving wheel 322 and a guide wheel 323. The wheel carrier 321 is configured in a substantially straight shape, and the wheel carrier 321 extends outward from a side of the vehicle body 31. The wheel carrier 321 includes a first end and a second end opposite to the first end. A first end of the wheel carrier 321 faces the vehicle body 31, and a second end of the wheel carrier 321 is distal to the vehicle body 31. The second end of the wheel carrier 321 can protrude outward from the side of the vehicle body 31. The driving wheel 322 and the guide wheel 323 are both mounted on the second end of the wheel carrier 321. A axis of the driving wheel 322 is perpendicular to an extending direction of the wheel carrier 321. The guide wheel 323 is arranged on a side of the driving wheel 322, and an axis of the guide wheel 323 is parallel to the extending direction of the wheel carrier 321. The axis of the guide wheel 323 lies in a plane that passes through a center of the driving wheel 322 and is perpendicular to the axis of the driving wheel 322. This makes an outer peripheral surface of the driving wheel 322 face the guide wheel 323, and the guide wheel 323 can be always in a travelling direction of the driving wheel 322.

In this embodiment, the wheel carrier 321 can rotate around its central axis in the extending direction. The central axis is perpendicular to the axis of the driving wheel 322. The central axis preferably passes through the center of the driving wheel 322. Since the wheel carrier 321 can rotate around its central axis, the traveling direction of the driving wheel 322 can be changed by rotating the wheel carrier 321.

The widths of the first groove 131, the second groove 141 and the guide groove 113 are all greater than a diameter of the guide wheel 323, and the guide wheel 323 can extend into the first groove 131, the second groove 141 and the guide groove 113. When the transport vehicle 3 runs horizontally along the first groove 131, since the diameter of the guide wheel 323 is larger than the width of the driving wheel 322, the guide wheel 323 is hung on a side wall of the first groove 131 and carries the body 31. When the driving wheel 322 runs vertically along the second groove 141, the driving wheel 322 carries the vehicle body 31, and the guide wheel 323 interacts with the side wall of the second groove 141 to guide the driving wheel 322 to move along the first groove 131.

Figure 10:
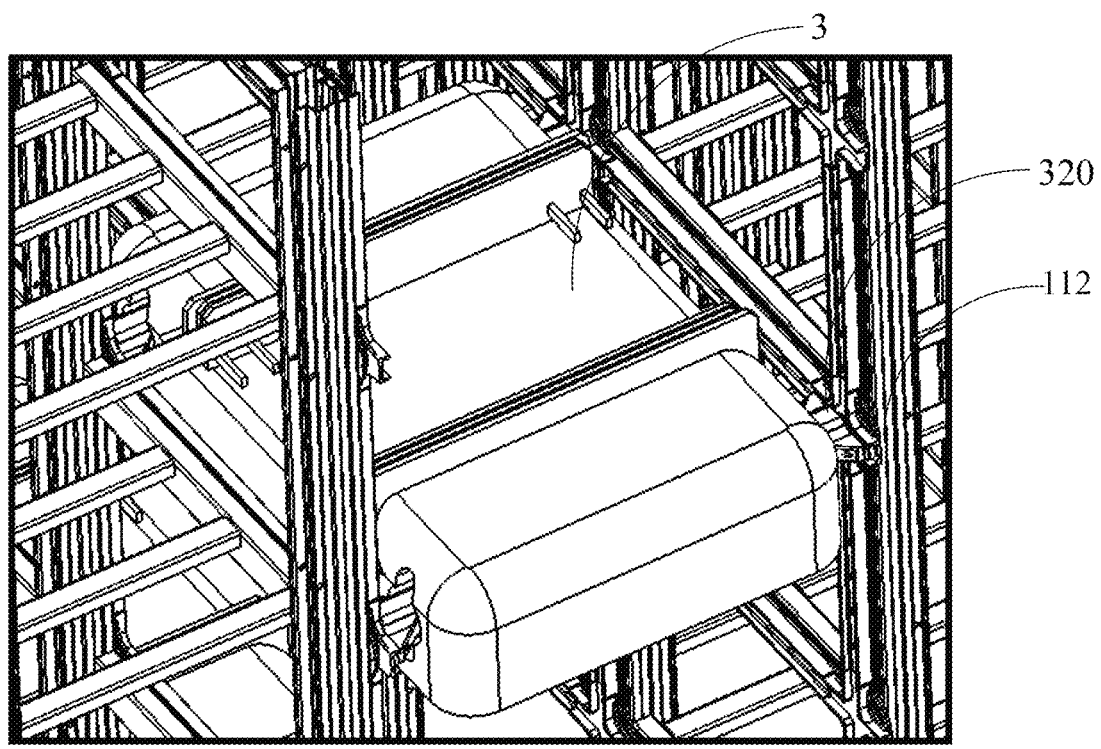
FIG. 10 is a diagram showing a transport vehicle traveling on a stereoscopic rack according to an exemplary embodiment.
Figure 11:
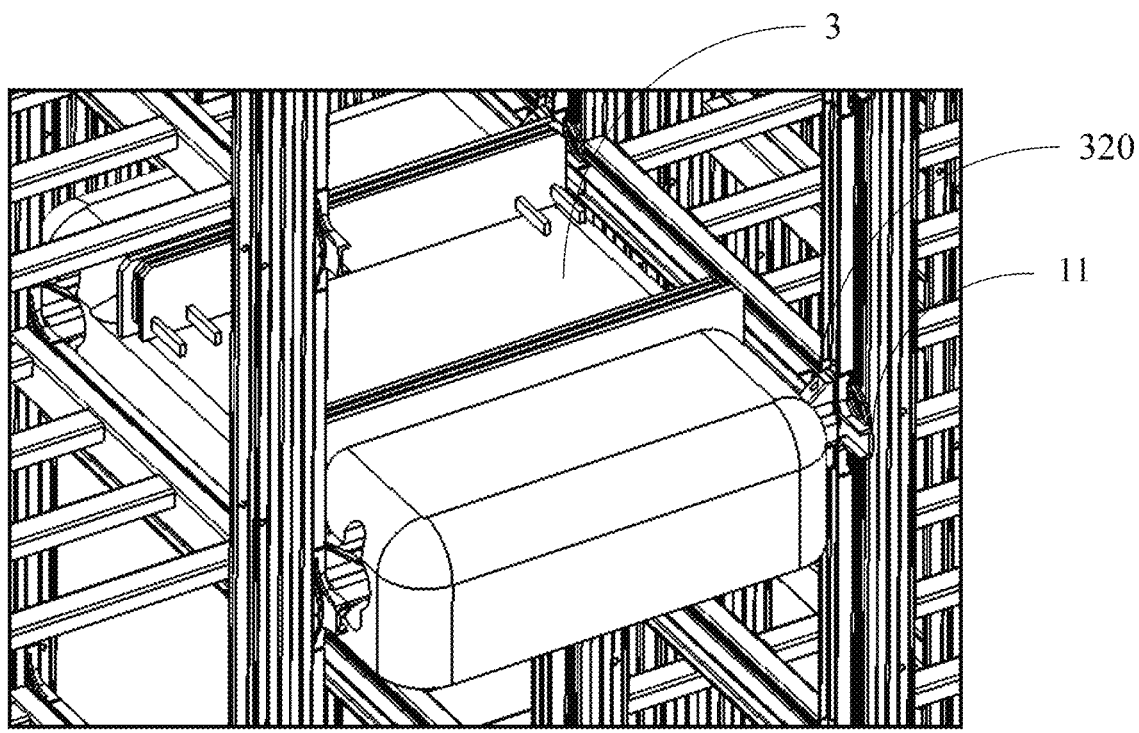
FIG. 11 is a diagram showing a transport vehicle traveling on a stereoscopic rack according to an exemplary embodiment.

When the transport vehicle 3 needs to travel from the first rail 13 to the second rail 14, the rotating part 112 can be first rotated to a position where the guide grooves 113 are connected to both of the first groove 131 and the second groove 141, and then the driving wheel 322 to make the crawling assembly 320 enter the guide groove 113 from the first groove 131. At this time, states of the crawling assembly 320 and the rotating part 112 is as shown in FIG. 10. Then the wheel carrier 321 can be driven to rotate by 90°. The rotating part 112 is driven to rotate as the wheel carrier 321 rotates. When the rotating part 112 rotates by 90°, the guide groove 113 is connected to both of the first groove 131 and the second groove 141 respectively. At this time, the states of the crawling assembly 320 and the rotating part 112 is shown in FIG. 11, and the transport vehicle 3 can continue to travel toward the second groove 141 until it enters the second groove 141. In this way, the transport vehicle 3 can travel from the first rail 13 to the second rail 14. Similarly, the transport vehicle 3 can also travel from the second rail 14 to the first rail 13. In this way, along the guide rail assembly 10, the transport vehicle 3 can run both in a horizontal direction and a vertical direction, and thus the transport vehicle 3 has a more flexible running route.

The rail network is formed in rectangular grids, and the smallest cell of the rail network is one rectangular grid. The transport vehicle 3 can travel along the rail network, and the transport vehicle 3 can be steered at any steering guide rail 11 to switch rails, so that the transport vehicle 3 has more rails to run. When a rail in a traveling direction of the transport vehicle 3 is blocked, the transport vehicle 3 can bypass the blockage by switching rail without waiting for the rail to be cleared, which greatly improves handling efficiency of the transport vehicle 3.

The driving wheel 322 may be a flat wheel, a synchronous wheel, a gear or a sprocket. When the driving wheel 322 is a synchronizing wheel, a gear or a sprocket, it can engaged with corresponding transmission elements mounted in the first groove 131, the second groove 141, and the two straight grooves of the guide groove 113 to prevent slipping.

Further, two guide wheels 323 are provided. Each of the two guide wheels 323 is arranged the second end of the wheel carrier 321. The two guide wheels 323 are respectively located on opposite sides of the driving wheel 322. The wheel carrier 321 rotates around its central axis, which passes through the center of the driving wheel 322, and distances from the central axis to axes of the two guide wheels 323 are equal to each other.

The driving wheel 322 is arranged between the two guide wheels 323, which can completely avoid friction between the driving wheel 322 and side wall of the groove. When the transport vehicle 3 runs horizontally in the first groove 131, the two guide wheels 323 are hung on the side walls of the first groove 131 and carry the vehicle body 31. The two guide wheels 323 have same distances to a center axis of the wheel carrier 321. Deflection moments applied to the wheel carrier 321 by the two guide wheels 323 may cancel each other out, and thus force on the wheel carrier 321 is more reasonable.

Figure 12:
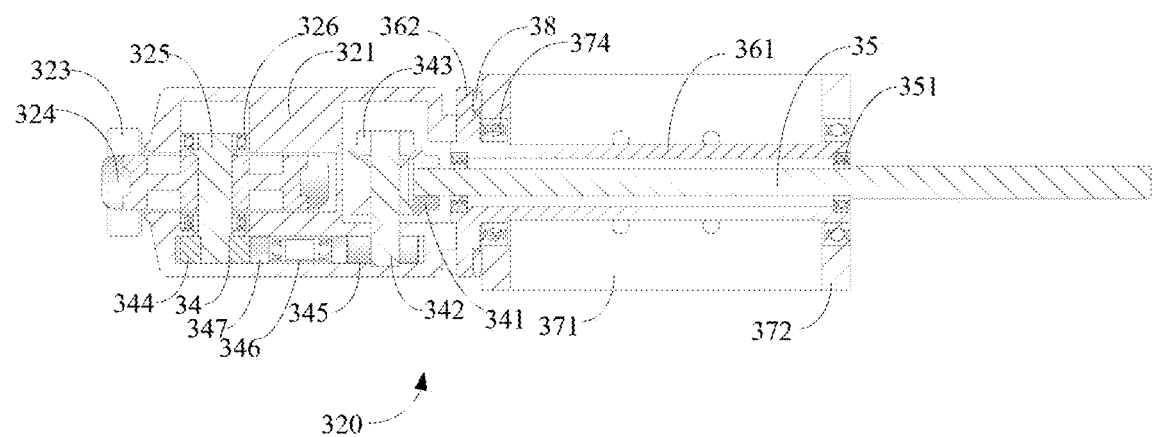
FIG. 12 is a cross-sectional view of overall of a crawling assembly according to an exemplary embodiment.
Figure 13:
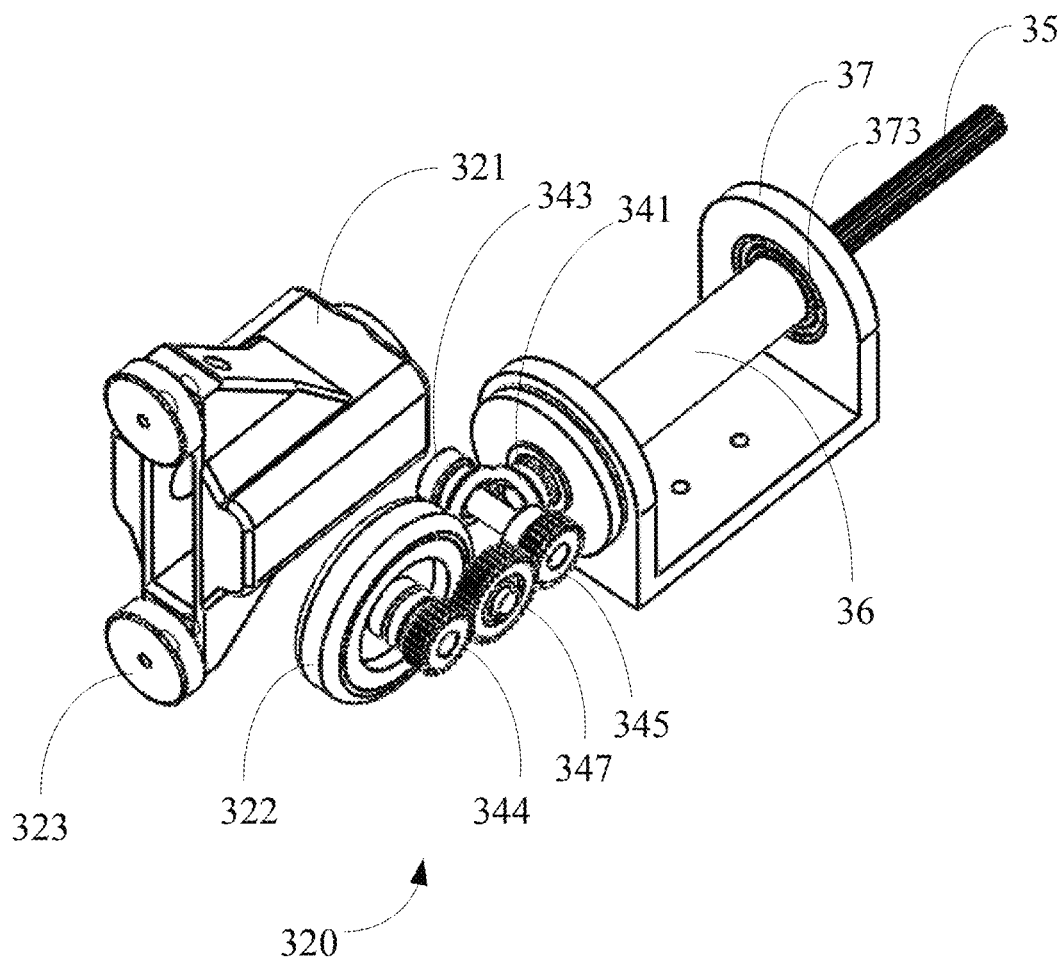
FIG. 13 is a diagram showing a disassembly of a crawling assembly according to an exemplary embodiment.

Further, referring to FIG. 12 and FIG. 13, the crawling assembly 320 includes a transmission mechanism 34, an input shaft 35, a rotating drum 36 and a mounting seat 37.

The mounting seat 37 is provided on the vehicle body 31. In this embodiment, the mounting seat 37 includes a bottom plate 371 and two side plates 372. The two side plates 372 are located on a same side at bottom, and both are perpendicular to the bottom plate 371. The two side plates 372 are parallel to each other. Both side plates 372 are provided with mounting through holes 373, and the mounting through holes 373 are circular through holes. The two mounting through holes 373 are aligned with each other, that is, the two mounting through holes 373 are arranged coaxially.

The rotating drum 36 includes a cylinder 361. The cylinder 361 has a cylindrical shape. A diameter of the cylinder 361 is smaller than that of the mounting through hole 373. The cylinder 361 is disposed in the mounting through hole 373. The cylinder 361 and the mounting seat 37 form a rotational connection. In this embodiment, the crawling assembly 320 further includes two slewing bearings 374, and inner rings of the two slewing bearings 374 are respectively sleeved on two ends of the cylinder 361. The slewing bearing 374 may be a radial bearing or a deep groove ball bearing. Outer rings of the two slewing bearings 374 are mounted in the mounting through hole 373 and form a fixed connection with the mounting through hole 373. There may be an interference fit between the outer ring of the slewing bearing 374 and the mounting through hole 373. In this way, the rotating drum 36 forms a rotational connection with the mounting seat 37 through the slewing bearing 374. It should be noted that the slewing bearing 374 may not be provided, and the rotational connection between the rotating drum 36 and the mounting seat 37 can also be realized through a clearance fit between the mounting through hole 373 and the rotating drum 36.

The first end of the wheel carrier 321 can be fixedly connected to an end of the rotating drum 36. A first end of the wheel carrier 321 and the end of the rotating drum 36 may be welded, screwed or bolted to each other. In this way, the wheel carrier 321 can be mounted on the rotating drum 36, and the rotating drum 36 can drive the wheel carrier 321 to rotate around an axis of the rotating drum 36. At this time, the central axis of the wheel carrier 321 in the extending direction thereof coincides with the axis of the rotating drum 36.

The driving wheel 322 includes a roller body 324 and a first rotating shaft 325. The roller body 324 is circular with a through hole in a center of the roller body 324. The first rotating shaft 325 is cylindrical. The first rotating shaft 325 is coaxially arranged with the roller body 324. The driving wheel 322 is sleeved on the first rotating shaft 325 and forms a fixed connection with the first rotating shaft 325. There may be an interference fit between the driving wheel 322 and the first rotating shaft 325. The first rotating shaft 325 is rotatably connected to the second end of the wheel carrier 321. An extending direction of the first rotating shaft 325 and the extending direction of the wheel carrier 321 are perpendicular to each other. In this embodiment, two bearings 326 are provided in the second end of the wheel carrier 321, and inner rings of the two bearings 326 are respectively sleeved on two ends of the first rotating shaft 325. Two through holes 327 are respectively provided on inner walls of both sides of the wheel carrier 321, and outer rings of the two bearings 326 are respectively arranged in the two through holes 327 to form a fixed connection with the mounting through holes 373. In this way, a rotational connection is formed between the driving wheel 322 and the wheel carrier 321. A part of the roller body 324 is accommodated in the wheel carrier 321, and another part protrudes from the second end of the wheel carrier 321.

The input shaft 35 has a straight bar shape. The input shaft 35 is coaxially arranged with the rotating drum 36. A diameter of the input shaft 35 is smaller than that of an inner hole of the input shaft 35. The input shaft 35 can penetrate the rotating drum 36 and extend into the wheel carrier 321 from the first end of the wheel carrier 321. The input shaft 35 can rotate relative to the wheel carrier 321 and around an axis of the input shaft 35. In this embodiment, the crawling assembly 320 further includes a bearing 351 arranged between the input shaft 35 and the rotating drum 36. The bearing 351 is arranged in the rotating drum 36, the inner ring of the bearing 351 is sleeved on the input shaft 35, and an outer ring of the bearing 351 abuts against an inner wall of the rotating drum 36. Two bearings 351 can be respectively provided at both ends of the rotating drum 36. The axis of the input shaft 35 passes through the center of the driving wheel 322 and is perpendicular to the axis of the driving wheel 322.

The transmission mechanism 34 is arranged in the wheel carrier 321. The transmission mechanism 34 is respectively drivingly connected to the input shaft 35 and the driving wheel 322 to transfer a torque delivered by the input shaft 35 to the driving wheel 322 to drive the driving wheel 322 to roll. The transmission mechanism 34 includes a first bevel gear 341, a second rotating shaft 342 and a second bevel gear 343. The second rotating shaft 342 is parallel to the first rotating shaft 325. The second rotating shaft 342 is provided at the first end of the wheel carrier 321. The second bevel gear 343 is sleeved on the second rotating shaft 342 and forms a fixed connection with the second rotating shaft 342. The second rotating shaft 342 is inserted into a shaft hole in the wheel carrier 321 and is in clearance fit with the shaft hole. The second rotating shaft 342 can rotate around its own axis in the shaft hole. The first bevel gear 341 is sleeved on an end of the input shaft 35 that extends into the wheel carrier 321 and engaged with the second bevel gear 343. The angle between the two shafts is 90°. Cooperation of the first bevel gear 341 and the second bevel gear 343 can change a direction of an input torque.

The second rotating shaft 342 is in a transmission connection with the first rotating shaft 325. There may be a belt transmission, chain transmission or gear transmission between the second rotating shaft 342 and the first rotating shaft 325. In this embodiment, gear transmission is formed between the second rotating shaft 342 and the first rotating shaft 325, and the transmission mechanism 34 further includes a first cylindrical gear 344, a second cylindrical gear 345, a third cylindrical gear 347, and a mandrel 346. The first cylindrical gear 344 is sleeved on the first rotating shaft 325 and is fixedly connected to the first rotating shaft 325. The second cylindrical gear 345 is sleeved on the second rotating shaft 342 and is fixedly connected with the second rotating shaft 342. The mandrel 346 is disposed between the first rotating shaft 325 and the second rotating shaft 342 and is parallel to the first rotating shaft 325. The third cylindrical gear 347 is sleeved on the mandrel 346, and the third cylindrical gear 347 can rotate around an axis of the mandrel 346. The mandrel 346 is fixed on the inner wall of the wheel carrier 321, and the third cylindrical gear 347 is in clearance fit with the mandrel 346, and the third cylindrical gear 347 can rotate around the mandrel 346. The first cylindrical gear 344 can be engaged with the third cylindrical gear 347, and the third cylindrical gear 347 can be engaged with the second cylindrical gear 345.

In this embodiment, after the input shaft 35 is driven by an external force to rotate around its own axis, the input shaft 35 drives the first bevel gear 341 to rotate, the first bevel gear 341 drives the second shaft 342 to rotate, and the second shaft 342 drives the second cylindrical gear 345 to rotate, the second cylindrical gear 345 drives the third cylindrical gear 347 to rotate, the third cylindrical gear 347 drives the first cylindrical gear 344 to rotate, and the first cylindrical gear 344 drives the driving wheel 322 to roll. Thus, the torque input from the input shaft 35 can drive the driving wheels 322 to roll.

The first traveling mechanism 32 also includes a crawling drive assembly and a rotating drive assembly, and both the crawling drive assembly and the rotating drive assembly are arranged inside the vehicle body 31. The crawling drive assembly is used to drive the input shaft 35 to rotate. The crawling drive assembly may include four first motors, main shafts of the four first motors are respectively in transmission connection to the four input shafts 35, and each first motor drives one input shaft 35 to rotate. There may be a gear transmission between the main shaft of the first motor and the input shaft 35. The rotating drive assembly is used to drive the rotating drum 36 to rotate. The rotating drive assembly may include four second motors, and main shafts of the four second motors are in transmission connection with the four rotating drums 36 respectively. Each second motor drives a rotating drum 36 to rotate. There may be a gear transmission between the main shaft of the second motor and the rotating drum 36.

The driving wheel 322 is mounted on the wheel carrier 321, and the wheel carrier 321 is mounted on the rotating drum 36. The rotating drive assembly can drive the rotating drum 36 to change the traveling direction of the driving wheel 322. Since the axis of the input shaft 35 passes through the center of the driving wheel 322 and is perpendicular to the axis of the driving wheel 322, and the input shaft 35 is coaxially arranged with the rotating drum 36, there will be no mutual interference between the rotating drum 36 driving the driving wheel 322 to turn and the input shaft 35 driving the driving wheel 322 to roll. At the same time, the input shaft 35 can extend into the vehicle body 31, and is driven to rotate by the crawling drive assembly arranged inside the vehicle body 31 to drive the driving wheel 322 to roll, without the crawling drive assembly being arranged on the wheel carrier 321, which makes the entire structure of the transport vehicle 3 more compact.

Further, the mandrel 346 is disposed between the first rotating shaft 325 and the second rotating shaft 342, and the axes of the first rotating shaft 325, the second rotating shaft 342, and the mandrel 346 are coplanar. In this way, the first cylindrical gear 344, the second cylindrical gear 345, and the third cylindrical gear 347 are sequentially arranged along a straight line, so that the wheel carrier 321 can have a smaller volume.

Further, a middle part of the second rotating shaft 342 is rotatably connected with the wheel carrier 321. The second bevel gear 343 and the second cylindrical gear 345 are respectively disposed at two ends of the second rotating shaft 342, and the first bevel gear 341 is located between the second bevel gear 343 and the second cylindrical gear 345. After this arrangement, the transmission mechanism 34 can be made more compact and smaller in size, and at the same time, the force on the second rotating shaft 342 can be more reasonable.

Further, the rotating drum 36 further includes a flange 362. The flange 362 is provided at an end of the cylinder 361 connected to the wheel carrier 321, and the flange 362 extends radially outward from the end of the cylinder 361. The flange 362 has a circular ring shape. An outer diameter of the flange 362 is larger than that of the mounting through hole 373. The crawling assembly 320 also includes a thrust bearing 38. The thrust bearing 38 is arranged coaxially with the cylinder 361. The thrust bearing 38 is sandwiched between the flange 362 and an outer wall of the mounting seat 37. In this way, the thrust bearing 38 can carry the axial load transferred from the wheel carrier 321 and avoid the slewing bearing 374 from carrying excessive axial load. Furthermore, a side of an outer edge of the flange 362 close to the mounting seat 37 is recessed inward to form an annular gap, and the thrust bearing 38 is mounted in the annular gap. In this way, the thrust bearing 38 can be restricted in position to prevent the thrust bearing 38 from moving.

Further, the first traveling mechanism 32 also includes a telescopic drive assembly. The telescopic drive assembly includes a plurality of sliding rails, a plurality of sliding blocks and a linear actuator. The sliding rails are all mounted on the vehicle body 31. The sliding rail is parallel to the extending direction of the wheel carrier 321. The plurality of sliding blocks are respectively arranged on the plurality of sliding rails. The slider can slide along the guide rail. The number of the sliders is the same as the number of the mounting seats 37, and the sliders and the mounting seats 37 are arranged in one-to-one correspondence. Each mounting seat 37 can be mounted on a corresponding slider. In this way, a sliding connection can be formed between the mounting seat 37 and the vehicle body 31.

The linear actuator is mounted on the vehicle body 31. The linear actuator is connected to the mounting seat, and the linear actuator can push the mounting seat to move along the sliding rail so that the crawling assembly 320 retracts into and extends out of the vehicle body 31. The linear actuator can be a push rod motor.

When the linear actuator drives the mounting seat 37 to slide into the inner vehicle body 31, the crawling assembly 320 can loosen the guide rail assembly 10 and retract into the vehicle body 31. When the linear actuator drives the mounting seat 37 to slide out of the vehicle body 31, the crawling assembly 320 can be combined with the guide rail assembly 10.

Figure 14:
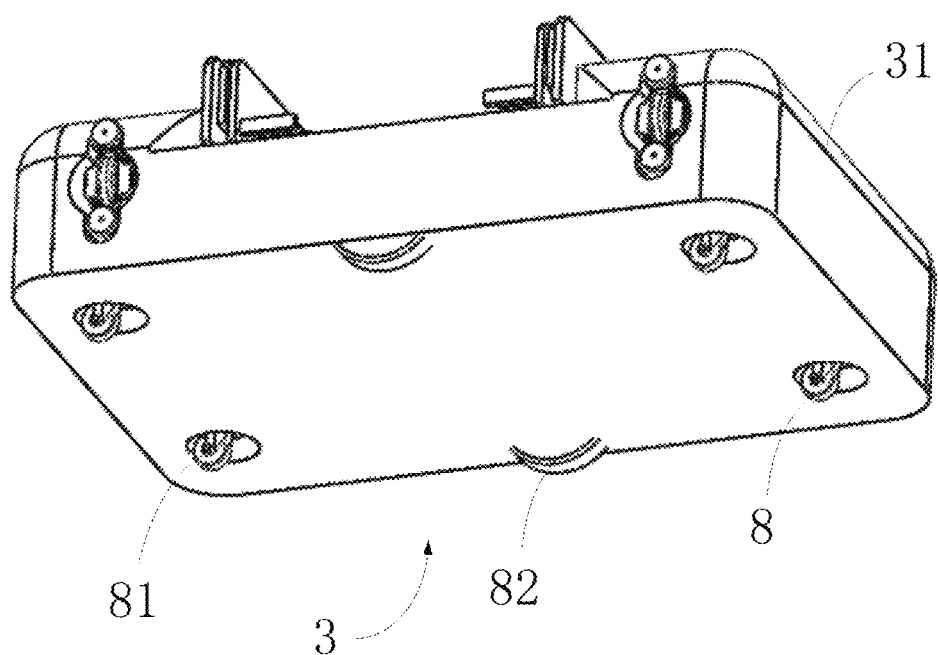
FIG. 14 is a perspective diagram showing a transport vehicle according to an exemplary embodiment.

Further, referring to FIG. 14, the transport vehicle 3 further includes a second traveling mechanism 8 provided at the bottom of the vehicle body 31. The second traveling mechanism 8 can run on the ground. The second traveling mechanism 8 includes a plurality of universal wheels 81 and two driving wheels 82. The plurality of universal wheels 81 are respectively located at both ends of the bottom of the vehicle body 31. There may be four universal wheels 81, which are respectively arranged on four corners of the bottom of the vehicle body 31, and the universal wheels 81 support the vehicle body 31. The two driving wheels 82 are respectively located at both sides of middle of the bottom of the vehicle body 31. Each driving wheel 82 rolls autonomously to drive the vehicle body 31 to travel on the ground. The transport vehicle can be steered by driving the two driving wheels 82 differentially.

Figure 15:
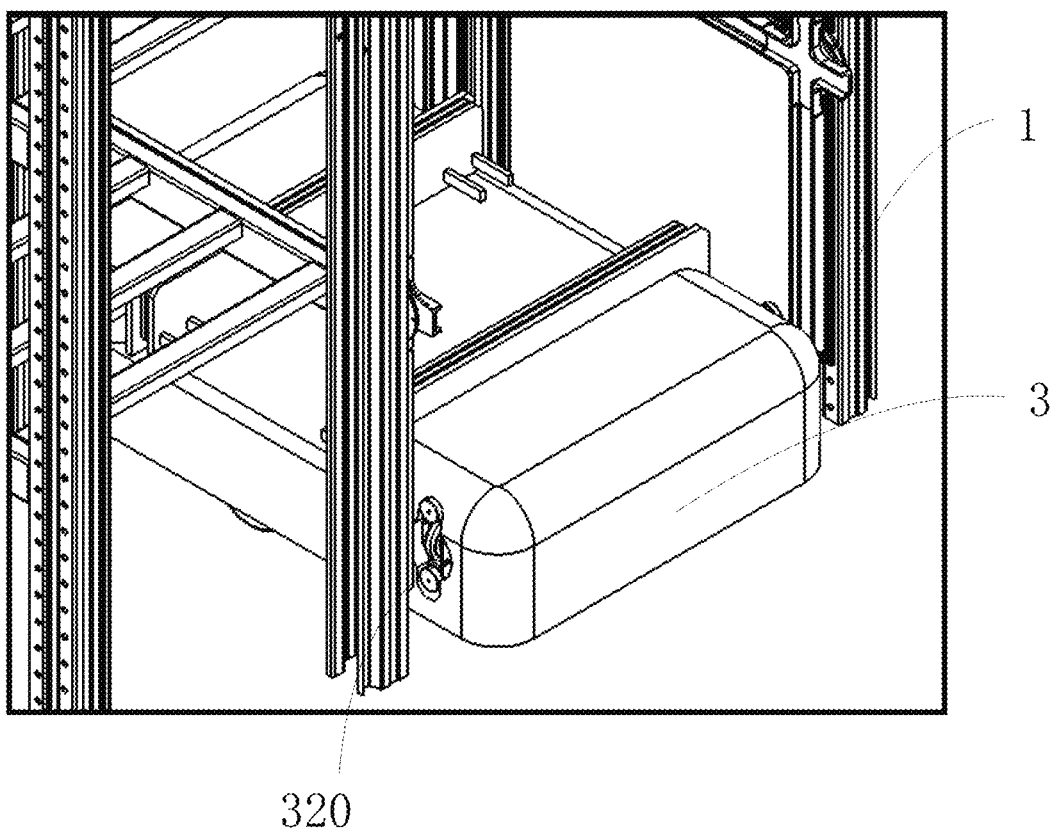
FIG. 15 is a perspective diagram showing a transport vehicle being separated from a rail assembly according to an exemplary embodiment.

Referring to FIG. 15, the second rail 14 extends to a bottom end of the rack body 20. The transport vehicle 3 can carry items to vicinity of the stereoscopic rack 1 from other places on the ground, and then enters into the aisle between the two stereoscopic racks 1, and then the crawling assembly 320 is extended from both sides of the vehicle body 31 and into the second rail 14 located in on both sides of the transport vehicle 3. In this way, the transport vehicle 3 can crawl on the stereoscopic rack 1 through the crawling assembly 320, and then the items on the transport vehicle 3 can be transported to the storage bracket 21 of the rack body 20 through a fork component on the transport vehicle 3. Correspondingly, the fork component of the transport vehicle 3 can also be used to take out the items from the stereoscopic rack 1, and then the transport vehicle 3 can crawl along the stereoscopic rack 1 through the crawling assembly 320 to the bottom of the stereoscopic rack 1 until the second traveling mechanism 8 of the transport vehicle 1 hits the ground. Then the crawling assembly 320 is retracted into the vehicle body 31 so that the crawling assembly 320 is separated from the second rail 14, and then the item can be transported on the ground to a designated position. In this way, the transport vehicle 3 can not only travel along the ground, but also travel on the stereoscopic rack 1. The transport vehicle 3 has wider adaptability and stronger functions.

Although the present disclosure has been disclosed with reference to certain embodiments, various variations and modifications can be made to the described embodiments without departing from the scope and spirit of the present disclosure. Therefore, it should be understood that the present disclosure is not limited to the illustrated embodiments, and protection scope thereof should be defined by the content of the appended claims and their equivalent structures and solutions.

What is claimed is:

1. A transport vehicle, comprising: a vehicle body (31) and a first traveling mechanism (32) mounted on the vehicle body (31);
   wherein the first traveling mechanism (32) comprises:
   a plurality of crawling assemblies (320) respectively provided on two opposite sides of the vehicle body (31), and each crawling assembly (320) comprises:
      a wheel carrier (321) extending outwardly from a side of the vehicle body (31);
      a driving wheel (322) mounted on the wheel carrier (321) and having an axis perpendicular to an extending direction of the wheel carrier (321), the driving wheel (322) being rotatable about the axis;
   wherein, the wheel carrier (321) has a central axis in the extending direction and is rotatable about the central axis.

2. The transport vehicle according to claim 1, wherein the each crawling assembly (320) further comprises:
   a guide wheel (323) mounted on the wheel carrier (321) and having an axis parallel to the extending direction of the wheel carrier (321).

3. The transport vehicle according to claim 2, wherein the central axis of the wheel carrier (321) passes through a center of the driving wheel (322), and
   a number of the guide wheels (323) is two, and the two guide wheels (323) are respectively arranged on two opposite sides of the driving wheel (322) and have a same distance to the central axis of the wheel carrier (321).

4. The transport vehicle according to claim 1, wherein the wheel carrier (321) is configured to be retractable into and extendable out of the vehicle body (31); and
   the transport vehicle further comprises a second traveling mechanism (8) arranged on a bottom of the vehicle body (31), wherein the second traveling mechanism (8) is configured to be movable on ground.

5. The transport vehicle according to claim 4, wherein the second traveling mechanism (8) comprises:
   a plurality of universal wheels (81) respectively disposed at both ends of the bottom of the vehicle body (31), and
   two driving wheels (82) respectively disposed at both sides of middle of the bottom of the vehicle body (31).

6. The transport vehicle according to claim 4, wherein the each crawling assembly (320) further comprises:
   a mounting seat (37) slidably connected with the vehicle body (31);
   a rotating drum (36) rotatably connected with the mounting seat (37), the rotating drum (36) being rotatable around an axis of the rotating drum (36);
   a transmission mechanism (34) arranged in the wheel carrier (321), wherein the transmission mechanism (34) is in transmission connection with the driving wheel (322); and
   an input shaft (35) penetrating the rotating drum (36) and extending from a first end of the wheel carrier (321) into the wheel carrier (321), wherein the input shaft (35) is in transmission connection with the transmission mechanism (34), and both of an axis of the input shaft (35) and the axis of the rotating drum (36) are coincide with the central axis of the wheel carrier (321);
   wherein the first traveling mechanism (32) further comprises a crawling drive assembly for driving the input shaft (35) to rotate, and a rotating drive assembly for driving the rotating drum (36) to rotate.

7. The transport vehicle according to claim 6, wherein the first traveling mechanism further comprises a telescopic drive assembly, and the telescopic drive assembly comprises:
   a plurality of sliding rails disposed to be parallel to the central axis of the wheel carrier (321) and arranged on the vehicle body (31);
   a plurality of sliding blocks mounted on the plurality of sliding rails respectively and connected to a plurality of mounting seats (37) respectively; and
   a linear actuator configured to drive the plurality of mounting seat (37) to slide.

8. The transport vehicle according to claim 6, wherein a first rotating shaft (325) is provided on the driving wheel (322), and is rotatably connected with the wheel carrier (321); and
   the transmission mechanism (34) comprises:
   a first bevel gear (341) sleeved on the input shaft (35);
   a second rotating shaft (342) rotatably connected to the wheel carrier (321) and parallel to the first rotating shaft (325);
   a second bevel gear (343) sleeved on the second rotating shaft (342) and engaged with the first bevel gear (341);
   wherein, the second rotating shaft (342) is in transmission connection with the first rotating shaft (325).

9. The transport vehicle according to claim 8, wherein the transmission mechanism (34) further comprises:
   a first cylindrical gear (344) sleeved on the first rotating shaft (325);
   a second cylindrical gear (345) sleeved on the second rotating shaft (342);
   a mandrel (346) mounted on the wheel carrier (321) and parallel to the first rotating shaft (325);
   a third cylindrical gear (347) sleeved on the mandrel (346), wherein the third cylindrical gear (347) is rotatable about the mandrel (346), the third cylindrical gear (347) is engaged with the first cylindrical gear (344) and the second cylindrical gear (345) respectively.

10. The transport vehicle according to claim 9, wherein a middle part of the second rotating shaft (342) is rotatably connected with the wheel carrier (321), and the second bevel gear (343) and the second cylindrical gears (345) are respectively arranged at both ends of the second rotating shaft (342), and the first bevel gear (341) is disposed between the second bevel gear (343) and the second cylindrical gear (345).

11. The transport vehicle according to claim 1, wherein the vehicle body (31) comprises a front end (41) and a rear end (42) opposite to the front end (41); and
   the plurality of crawling assemblies (320) have at least four crawling assemblies (320), wherein two crawling assemblies (320) are respectively disposed on two opposite sides of the front end (41), and another two crawling assemblies (320) are respectively disposed on two opposite sides of the rear end (42).

12. The transport vehicle according to claim 1, wherein the driving wheel (322) is a flat wheel, a synchronous wheel, a gear or a sprocket.

* * * * *